June 22, 1943.                F. S. FLOETER                2,322,623
                                LATHE CHUCK
                          Filed Dec. 16, 1939          4 Sheets-Sheet 1
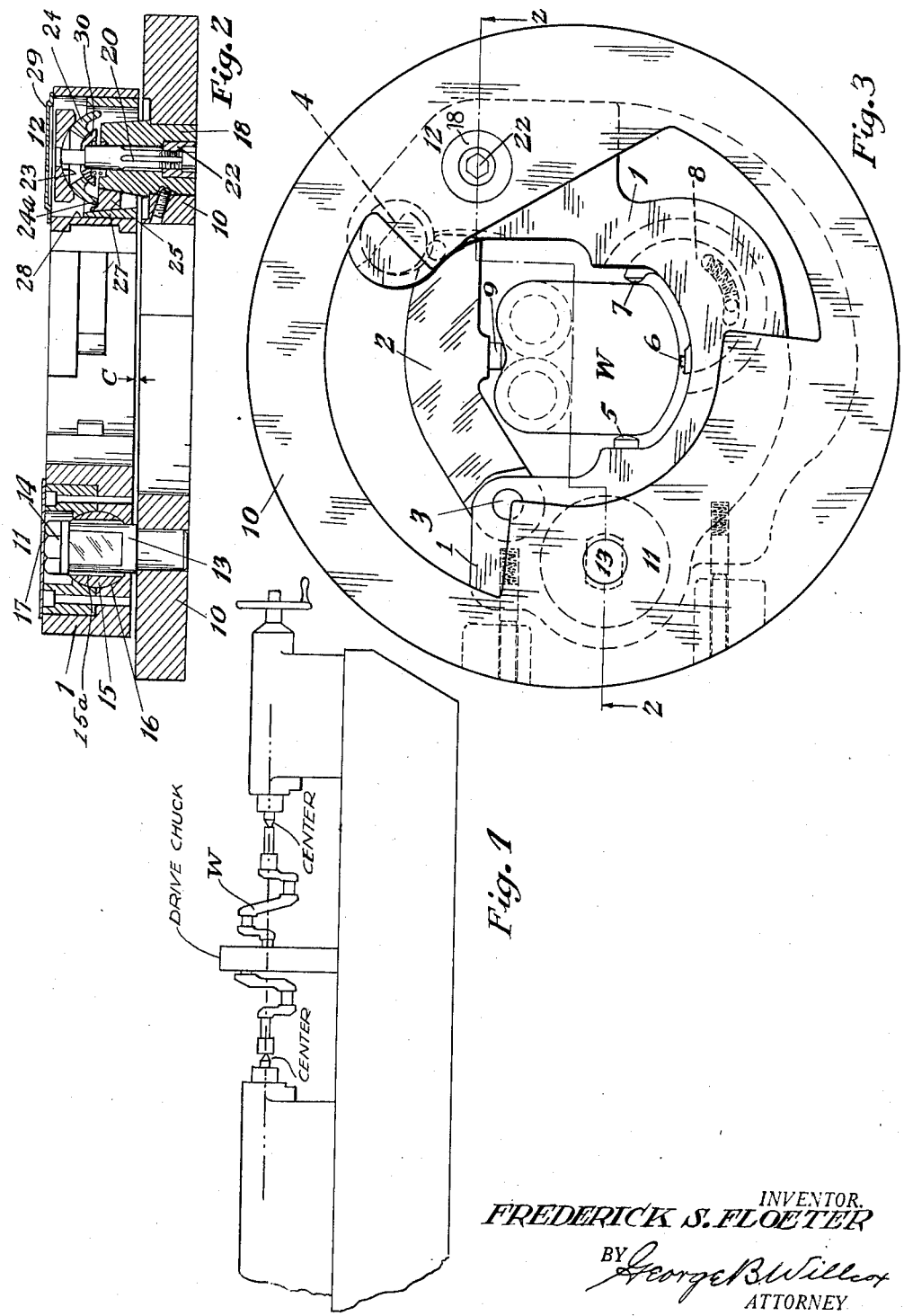
INVENTOR.
FREDERICK S. FLOETER
BY George B. Willcox
ATTORNEY June 22, 1943.    F. S. FLOETER    2,322,623
LATHE CHUCK
Filed Dec. 16, 1939    4 Sheets-Sheet 2

INVENTOR.
FREDERICK S. FLOETER
BY George B. Willcox
ATTORNEY

June 22, 1943.　　　F. S. FLOETER　　　2,322,623
LATHE CHUCK
Filed Dec. 16, 1939　　　4 Sheets-Sheet 3
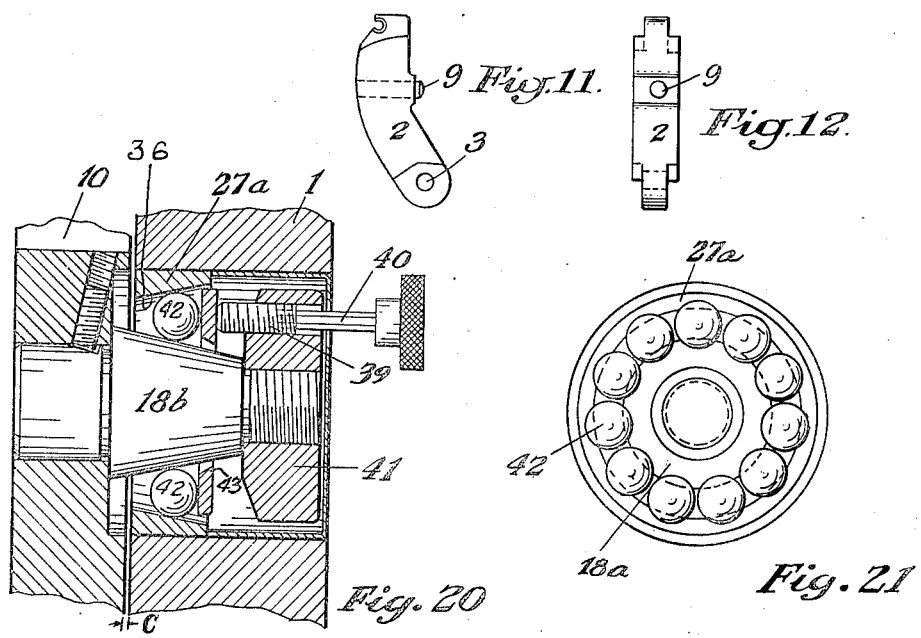
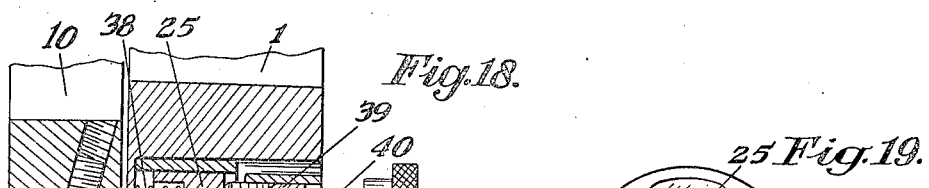
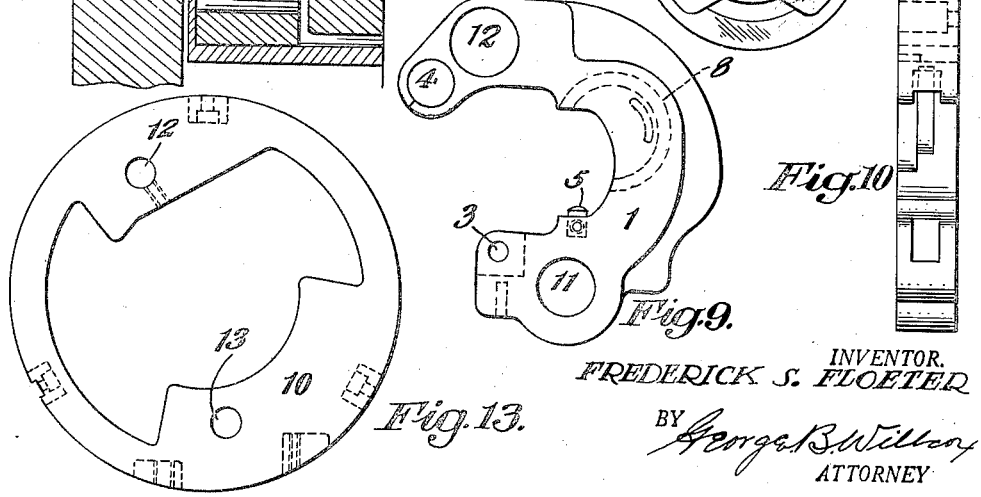
INVENTOR.
FREDERICK S. FLOETER
BY George B. Willson
ATTORNEY

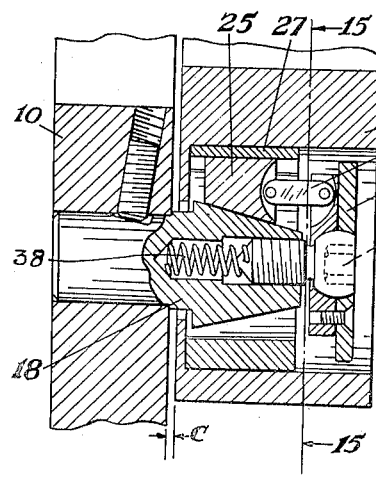
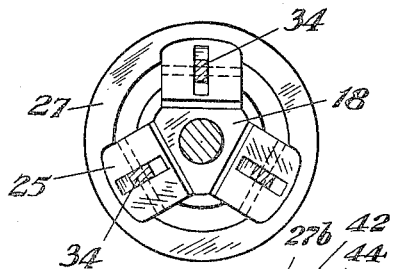
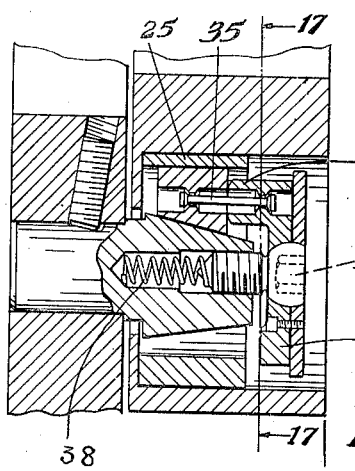
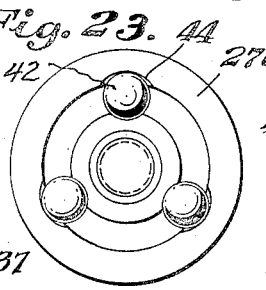
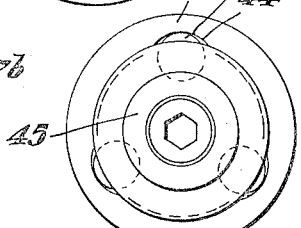
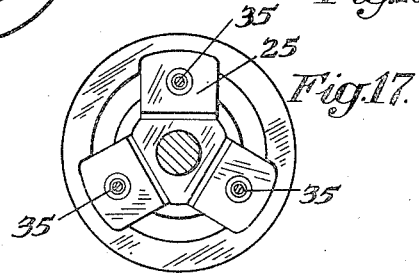
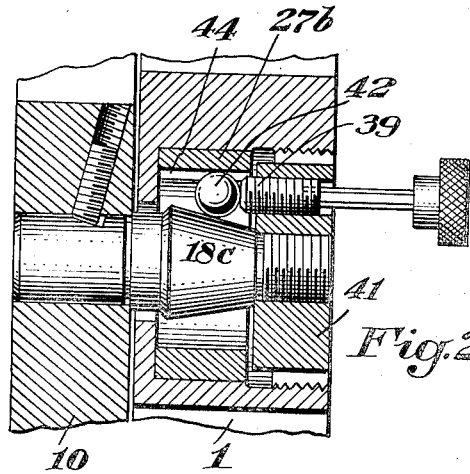
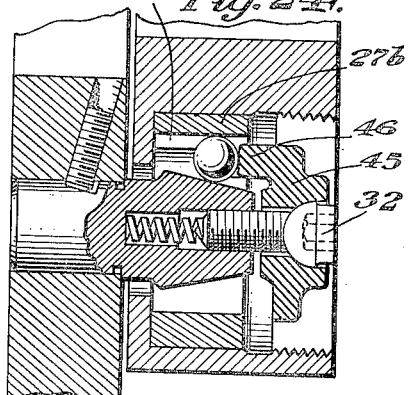

Patented June 22, 1943

2,322,623

UNITED STATES PATENT OFFICE 2,322,623

LATHE CHUCK

Frederick S. Floeter, Saginaw, Mich., assignor to Wickes Bros., Saginaw, Mich., a corporation of Michigan Application December 16, 1939, Serial No. 309,581

13 Claims. (Cl. 82—40)

This invention relates to lathe chucks such as are used for centering and rotating crank-shafts and other work to be turned and pertains more particularly to improvements in such chucks whereby the work is seized and gripped by pivoted jaws that are floatingly mounted on the chuck ring or disk.

The improvement pertains to means on the floating jaws enabling them to automatically conform themselves to the shape and configuration of the work and to floatingly locate themselves relatively to the chuck ring on which the jaws are mounted. The improvement relates also to improved means for locking the jaws when in such location, to the drive ring of the chuck.

My invention provides a novel arrangement and mode of operation of work contacting devices on the jaws, designed so that the jaws can be applied to a work piece that has not been provided with spots or machined areas, and can be clamped thereon in such a way as to adapt itself automatically to the configuration and unevennesses of the work surface without exerting any harmful tendency to urge or spring the work piece out of alinement.

Furthermore, my invention provides novel means for locking the jaws to the clutch ring after they have seized the work piece in the normal manner above alluded to. This novel locking structure does not depend, as in earlier machines, upon means for clamping the jaws face-to-face against the clutch ring and thereby subjecting the work or the clutch to undesirable stresses, but instead it fixes the jaws to the clutch ring without developing any tendency to disturb the normal or natural position already assumed by the clutch jaws while being clamped to the work piece.

It distinguishes from earlier floating chuck jaws which, after having seized a work piece were usually locked to the clutch ring by clamping means that forced the sides of the jaws against the face of the ring to keep them together frictionally. Such arrangement was not satisfactory in machines handling heavy work because the necessary force required to lock by clamping the faces of the jaws against the face of the ring disturbed the normal alinement of the work piece with the lathe centers, the result being that the work could not be machined with sufficient precision.

With the foregoing and certain other objects in view which will appear later in the specification, my invention comprises the devices described and claimed and the equivalents thereof.

In the drawings, Fig. 1 is a diagrammatic front view of a center drive crank-shaft lathe showing lathe centers in relation to a center drive chuck of a known type to which my invention is adapted to be applied;

Fig. 2 is a diametral sectional view through the chuck, the conventional gear and pinion drive and the work piece being omitted, showing a preferred arrangement of the drive ring and the connections whereby the work-clamping jaws are mounted floatingly on the ring and are releasably locked thereto, the section being taken on line 2—2 of Fig. 3;

Fig. 3 is a rear face view of the drive ring with the clamping jaws and work piece in place, the ring being illustrated as seen from below in Fig. 2;

Figs. 9 and 10 are respectively side and edge views of the principal clamping jaw;

Figs. 11 and 12 are respectively side and edge views of the cap jaw;

Fig. 13 is a face view of the drive ring;

Fig. 14 is a view similar to Fig. 4, showing a modified means for tightening the wedges;

Fig. 15 is a sectional view on line 15—15 of Fig. 14, showing the annular ring, the wedges and the abutment post, the associated parts being omitted;

Figs. 16 and 17 are views similar to Figs. 14 and 15 respectively, showing a still further modified form; and Figs. 18 to 25, inclusive, show further modified forms, balls being employed in the structure of Figs. 20 to 25, inclusive, instead of wedges as in the previous figures.

Figure 4:
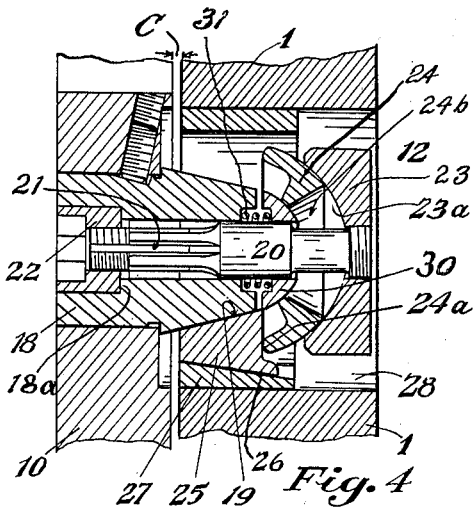
Fig. 4 is an enlarged sectional view of the preferred means for clamping the floating jaws to the drive ring.

W, Figs. 1 and 3, represents diagrammatically the work piece which in this instance is a multiple throw crank-shaft for an engine. When mounted between lathe centers the work is coaxial with them and with the center of revolution of the chuck. That part of my invention which includes the provision of work clamping members or jaws equipped with gripping fingers adapted to seize the work without skewing it and without tending to urge the jaws out of their normal plane, will now be explained.

Numeral 1, Figs. 2, 3, 9, 10, designates a clamping jaw to which a cap jaw 2, detailed in Figs. 11 and 12, is hinged by means of a pintle 3. A member 4, indicated conventionally in Fig. 3 as an eccentric clamp, although it may be the usual swing bolt and nut arrangement, is mounted on jaw 1 for releasably engaging the cap jaw 2. Jaws 1, 2, pivot 3 and member 4, together with their associated parts constitute what I term the work-gripping or clamping assembly. Tightening the member 4 urges jaw 2 toward the lower jaw 1, thereby causing the assembly to seize a web or arm of the work piece W at points 5, 6, 7, 9, Fig. 3, all being located in a plane transverse to the axis of rotation.

A new and useful feature is in the mounting, arrangement and mode of operation of the work seizing elements, 5 to 9, on the jaws 1, 2. Each element, 5 to 9, that engages the work W is rounded at its end so as to give approximately point contact, thus permitting the pivoted jaws 1, 2, to attach themselves normally and accurately to a rough work piece that has no accurately spotted clamping areas. Their function is to seize the work by point contacts that can not introduce, between the chuck and the work, incidental and undesirable strains of a character that might tend to force the work or the jaws askew and thereby impair the accuracy of machining under conditions of quantity production. Heretofore such work pieces have been grasped between V-block abutments mounted parallel with the axis of rotation of the work W. If the work surface was rough or uneven the V-blocks tended to twist the work out of alinement and caused inaccurate machining.

Numeral 5 designates a rounded button on lower jaw 1, and 6 is an equalizer button at the bottom of the work piece. Numeral 7 designates an equalizer finger opposite the button 5. Button 6 and finger 7 are both mounted on a segment-shaped tiltable equalizer 8 which is slidingly seated in suitable arcuate ways provided in jaw 1.

A button 9 on cap jaw 2 engages the work W at the top in opposition to equalizer button 6. When member 4 is actuated in the locking direction the button 9 clamps down on the work piece W and the button 6, carried by equalizer 8 on jaw 1, is urged upwardly with equal force, due to the pintle connection 3. Such thrust tends to rotate equalizer 8, causing the equalizer finger 7 to be forced to the left, Fig. 3, thereby clamping the upright edges of the work W between members 7 and 5.

It will now be apparent that tightening member 4 causes work piece W to be seized with substantially equal gripping forces, vertically between buttons 6 and 9 and horizontally between button 5 and finger 7.

Having described the work clamping jaw assembly, its relationship to a drive ring 10 of any appropriate type of chuck will now be explained.

Figs. 2 and 3 illustrate a center drive chuck as it appears in loading position with jaws 1 and 2 clamped to work piece W. The work clamping assembly 1, 2, 3, 4 is connected to the drive ring 10 by two floating connections associated with floating jaw 1 and designated in a general way by numerals 11, 12, respectively.

The function of connection 11 is to permit jaw 1 to have bodily horizontal shifting and adapting movements relatively to drive ring 10, but no bodily vertical movement, and also to have rocking movements in its own plane about connection 11 while the clamping assembly is seizing the work W.

More specifically, the semi-floating connection 11, shown at the left in Figs. 2 and 3, is a somewhat conventional pivot structure comprising a fixed pintle 13 projecting from and secured to the face of drive ring 10. Two sides of pintle 13 are flattened and its end is threaded and provided with a nut 14. The pintle is surrounded by a bushing 15 held in place by nut 14. The bushing has a large central opening 15a presenting two flat walls that may slide on the flat sides of the pintle in a straight line toward or away from the center of the pintle. Although the bushing 15 is not rotatable, jaw 1 may rock on it, being provided with a bore 16 for that purpose. The whole pivotal connection is covered by a plate 17. The bushing 15 shown in Fig. 2 is spherical so the jaw 1 can not bind on the pintle 13, but if desired the bushing may be cylindrical.

Important and novel features of my claimed invention are embodied in the construction and mode of operation of the locking connection 12, which will now be explained. Connection 12 allows an end of jaw 1 remote from pivot 3 to move flotationally in any direction over the face of drive ring 10 in known manner, but my concept includes improved means whereby the clamping jaw assembly, after having floatingly adjusted itself to the work piece, is locked to the drive ring 10 in whatever position the jaw assembly may have freely assumed as the result of being clamped to the work piece by the clamping assembly, 1 to 4. The novel result is that such locking is accomplished without any tendency to urge the jaw 1 into contact with the face of ring 10 and without any tendency to set up aberrational strains either in the work piece W or in the jaw assembly. The relative positions of the planes of the jaw and ring remain undisturbed.

Preferably, there is a small clearance C between the faces of the jaw 1 and drive ring 10, both before the locking action and subsequently thereto. That is, the locking of jaw 1 against further flotation is accomplished without necessarily closing the clearance C and without disturbing the naturally assumed position of the floating assembly.

Figure 7:
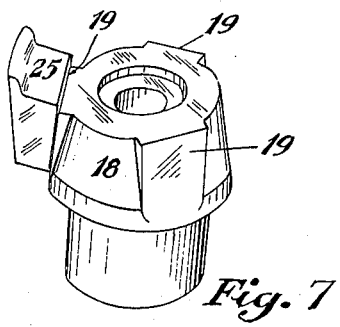
Fig. 7 is a perspective view of a wedge associated with the abutment post.

Referring now to the example illustrated as a preferred form in Figs. 2, 4, and 7, an abutment post 18 is immovably fixed to and projects from the face of drive ring 10, being practically integral therewith. The abutment post 18 has three wall portions spaced preferably 120 degrees around its circumference and presenting bearing faces 19.

Abutment 18 has a central passage formed with a shoulder 18a. Received within the passage with an end projecting beyond is a longitudinally slidable bar 20 splined to 18, shown best at 21, Fig. 4. A socket nut 22 received in the shouldered part of the passage is threaded to the end of bar 20. A disk 23 with a spherically dished inner face 23a is fastened on the projecting end of bar 20. Fitted to face 23a and freely tiltable thereon in all directions is a saucer-shaped washer 24 provided with a rim 24a and having a central aperture 24b through which the bar 20 projects without touching.

Abutment 18 co-operates with the work clamping assembly, parts 1 to 9, as follows: One of the jaws, 1 or 2, is preferably fitted with a liner 27 that loosely surrounds abutment 18, permitting floating movements of the jaw relatively to the abutment.

Figure 4A:
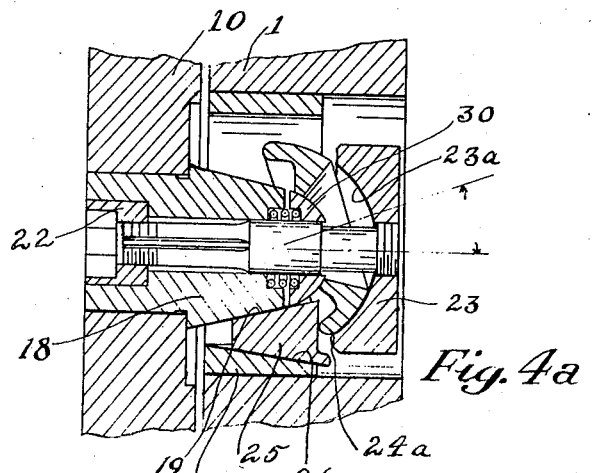
Fig. 4a is a view similar to Fig. 4 showing in a tilted position, the saucer-shaped washer for holding the wedges.

Figs. 4 and 4a show how the plane defined by rim 24a is tilted when the washer slides variously on the spherical face 23a in response to the movements of linearly shiftable members which I term fillers. The fillers are in the form of wedge-shaped elements 25, as in Figs. 1 to 7 and 14 to 19, or balls, 42, as in Figs. 20 to 25.

Figure 5:
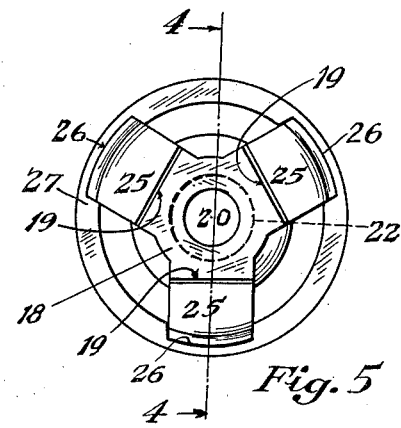
Fig. 5 is an end view of the abutment post, clamping wedges, and annular ring, shown in Fig. 4, the members for holding the wedges in locked position having been omitted.
Figure 6:
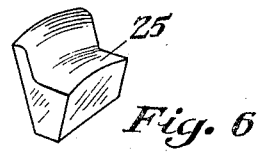
Fig. 6 is a perspective view of a wedge as shown in Figs. 4 and 5.
Figure 8:
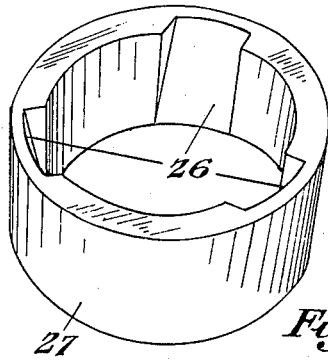
Fig. 8 is a perspective detail view of the annular ring provided with inclined walls for receiving the wedges.

The inner face of each filler 25, Figs. 5 and 7, is slidable on face 19 of abutment post 18. Its outer face slides linearly on a bearing face 26, Fig. 8, of a guiding channel provided in the inner wall of a liner ring 27. The opposed walls 19 and 26 are slightly divergent.

Liner 27 may be press-fitted or otherwise secured in a cylindrical bore 28 of jaw 1, Figs. 2 and 4, or it may be omitted and the wall 26 may be formed in jaw 1. A cap 29 covers the connection 12.

Locking connection 12 operates as follows:

While jaw 1 is being clamped to the work W it floats to a natural or normal position and thereby one or more of the fillers 25 becomes squeezed between opposing faces 19 of abutment 18 and walls 26 of the bore in ring 27. Thereby the fillers, or some of them, are shifted lengthwise of post 18, as shown in Figs. 4 and 4a respectively.

Assuming that certain of the elements 25 have been thus shifted linearly as a result of floating movements of jaw 1 while it was conforming itself to the configuration and surface of work W, it will be apparent that if ring 27 shall happen to have been shifted into a position concentric with abutment 18, then the several fillers 25 will be arranged with their outer ends all in a plane transverse to the axis of the abutment. If, however, the normal movement of jaw 1 has brought jaw 1 and ring 27 somewhat off center relatively to abutment 18, then the ends of fillers 25 will be in different transverse planes. Consequently the rim 24a will be tilted according to the amount of eccentricity between abutment 18 and ring 27.

Socket nut 22 is then tightened moderately to bring rim 24a to bear with equal pressure upon the several fillers 25, fixing them snugly between the divergent walls 19 and 26, Figs. 4 and 5. Thus the fillers are prevented from further sliding movements and the work-clamping members or jaws 1, 2 are powerfully and immovably locked to abutment post 18 and chuck ring 10.

The act of tightening the nut 22 will not disturb the position of floating jaw 1 relatively to drive-ring 10 since the wedges 25, urged by rim 24a, press equally against the walls 26 of ring 27 in at least three radial directions, and have no tendency to shift the jaw 1. Furthermore, tightening the nut 22 will not have any tendency to disturb clearance C nor cause jaw 1 to bind face-to-face against drive-ring 10.

It is now apparent how the endwise movements of the filler wedges 25 are produced by floating movements of jaw 1 while accommodating itself to the contour of work W, how the rim 24a will tilt according to such endwise movement of the wedges, and how tightening of socket nut 22 causes rim 24a to equally constrain the fillers 25 and make them lock the work-clamping assembly immovably to the drive-ring 10 in a normal manner without undesirable strains.

The spherical sliding movements of the keeper 24, Figs. 2, 4, 4a, and the tilting of its rim 24a may be additionally guided by providing a spherical segment member 30 between the end of abutment post 18 and the saucer-shaped washer. Segment 30 holds the washer in contact with the dished face 23a and may be backed by a compression spring 31, although the use of such a spring is optional in some installations.

Modifications of the preferred structure above described are shown in Figs. 14 to 25 inclusive.

In Figs. 14 and 15, a ball headed screw 32 is threaded in a bore provided in the projecting end of abutment post 18, and the head has ball-and-socket connection with a tiltable keeper disk 33 which is connected by three links 34 with the respective fillers 25. Tightening the screw 32 produces equal holding effect on each filler and so locks the liner ring 27 and jaw 1 against further floating movements relatively to the abutment post 18, as in the preferred embodiment of the invention.

In Figs. 16 and 17 a link in the form of a tie-rod 35 has a head at each end seated on shoulders provided in filler 25 and in a tiltable disk-like keeper 36, respectively, and there is a projection 37 on the disk which engages the end of each filler.

In Figs. 18 and 19 the fillers 25 are normally urged in the loosening direction by means of springs 38 which are opposed by socket screws 39, there being an individual screw alined with each filler 25. The screws can be tightened individually by means of a wrench 40. In this case the mounting for socket screw 39 is not tiltable, but consists of a disk 41 which is fixed on the projecting end of the abutment post 18.

In Figs. 20 and 21 the filler members 25 heretofore described as being bevel-faced or wedge-shaped are replaced by a series of balls 42 in an annular space presented by abutment post 18b and annular ring 27a. A loosely tiltable annular plate 43 keeps the balls confined so as to permit the series of balls as a whole to tilt when the clamping jaw 1 moves sidewise flotationally with respect to the drive-ring 10, in substantially the same manner as the wedges 25.

To clamp the plate 43, Fig. 20, against the balls 42 and thereby lock them between the abutment post 18b and the bearing face 36, socket screws 39, the disk 41 and the wrench 40 are provided, as in Fig. 18.

In Figs. 22 and 23 the structure is somewhat like that of Figs. 20 and 21 except that only three balls are employed and in this case a groove 44 is provided for each ball in the inner face of the annular ring 27b. Here the abutment post 18c is tapered similarly to that of Fig. 20, but the bore wall of ring 27b is not tapered.

In Figs. 24 and 25 three balls are employed as in Figs. 22 and 23 and a tiltable keeper disk 45 is mounted on a ball headed screw 32 after the manner of Figs. 14 and 16, but in this case the disk 45 is provided with a projecting member 46 to engage each filler ball 42. The tilting and equalizing action of tiltable disk 45 is substantially like that of the beaded rim 24a on the saucer-shaped washer illustrated in Fig. 4, but the member 45 in this case not only equalizes but also tightens down upon the fillers, thus performing the functions of the washer 24 and also of disk 23 in Figs. 2 and 4.

In certain of the forms described in Figs. 4 and 20, the bearing faces 26 on ring 27 or 27a are beveled to engage the filler members, such as wedges or balls; and in other views, as in Figs. 18 and 22, they are shown not beveled, but are opposed by inclined walls on the abutment, 18 or 18a. In each instance, however, the opposed walls are slightly divergent with respect to each other.

Having thus described my invention, what I claim and desire to secure by Letters Patent is:

1. A chuck including a drive ring, having in combination a cap jaw carrying an element formed with a rounded work-engaging end, a second jaw having a button directed substantially at right angles to said element; a hinge pintle joining the said jaws, jaw-tightening means, and floating pivotal connections and locking connections between said jaws and chuck ring; a segment-shaped equalizer peripherally slidable in the second jaw, a button on the equalizer opposite the said work-engaging element of the cap jaw, and a finger on said equalizer opposite the button of the second jaw, said work engaging parts having rounded ends presenting substantially point contacts with the work, such points lying in the same plane transverse to the axis of the work.

2. A chuck comprising a drive ring, an abutment immovably fixed to and projecting from a face thereof, a work-clamping member floatingly associated with the ring and formed with a bore loosely receiving the abutment to permit floating movements of the work-clamping member relatively to the abutment; having, in combination, a locking device comprising peripherally spaced pairs of bearing faces presented by said abutment and the wall of said bore respectively, the faces of each pair being opposed and slightly divergent; a filler member received between each pair of faces and adapted to be shifted linearly when squeezed therebetween during floating movements of said work-clamping member; a keeper engaging the several filler members in their variously shifted positions, and means adapted to fix said keeper in such engagements, thereby constraining the filler members from further shifting movements and the work-clamping members from further floating movements.

3. A chuck comprising a drive ring, an abutment immovably secured thereto, a work-clamping member floatingly associated with the ring and formed with a bore permitting floating movements of the work-clamping member relatively to the abutment; having, in combination, locking connection comprising peripherally spaced pairs of bearing faces presented by walls of said abutment and bore respectively, the faces of each pair being opposed and slightly divergent; a filler member received between the faces of each pair and adapted to be shifted linearly upon being squeezed therebetween during floating movements of the work-clamping member; said filler members being of wedge shape, the inner face of each being slidable on said bearing face of the abutment post, the outer face being slidable on the said bearing face of the bore, a keeper engaging the several filler members in their variously shifted positions, and means adapted to fix said keeper in such engagements, thereby constraining the filler members from further shifting movements and the work-clamping members from further floating movements.

4. A chuck comprising a drive ring, an abutment immovably secured to and projecting from a face thereof, a work-clamping member floatingly associated with the ring and formed with a bore loosely receiving the abutment so as to permit floating movements of the work-clamping member relatively to the abutment, in combination with a locking connection comprising peripherally spaced pairs of bearing faces presented by said abutment and the wall of said bore respectively, the faces of each pair being opposed and slightly divergent; one of said faces being formed with a groove, ball-shaped filler members received between the divergent faces of each pair and in said groove and adapted to be shifted linearly upon being squeezed therebetween during floating movements of the work-clamping member; a keeper engaging the several balls in their variously shifted positions, and means fixing said keeper in such engagements, thereby constraining the filler members from further shifting movements and the work-clamping members from further floating movements.

5. A chuck comprising a drive ring, an abutment post immovably secured to and projecting from a face thereof, a work-clamping member floatingly associated with the ring and formed with a bore loosely receiving the abutment so as to permit floating movements of the work-clamping member relatively to the abutment post, in combination with a locking connection comprising peripherally spaced pairs of bearing faces presented by said post and the wall of said bore respectively, the faces of each pair being opposed and slightly divergent; a filler member received between the faces of each pair and adapted to be shifted linearly when squeezed therebetween during floating movements of the work-clamping member; a keeper engaging the several filler members in their variously shifted positions, and comprising a saucer-shaped washer presenting a rim and having a central aperture, and a segmental guiding member interposed between the end of the abutment post and the keeper; and means adapted to fix said keeper and to thereby constrain the filler members from further shifting movements and the work-clamping members from further floating movements, said means comprising a disk having a spherically dished inner face, a bar secured to the disk and slidable lengthwise in a central passage formed in the abutment post, and a tightening nut threaded on the end of the bar.

6. A chuck comprising a drive ring, an abutment immovably secured and projecting from a face thereof, a work-clamping member floatingly associated with the ring and formed with a bore loosely receiving the abutment so as to permit floating movements of the work-clamping member relatively to the abutment; in combination with a locking connection comprising peripherally spaced pairs of bearing faces presented by said abutment and the wall of said bore respectively, the faces of each pair being opposed and slightly divergent; a filler member received between the faces of each pair and adapted to be shifted linearly when squeezed therebetween during floating movements of the work-clamping member, a ball headed screw adjustably threaded in a bore provided in the end of the abutment post, a keeper tiltably mounted on said screw, and links connecting the keeper with the respective fillers.

7. A chuck comprising a drive ring, an abutment immovably secured to and projecting from a face thereof, a work-clamping member floatingly associated with the ring and formed with a bore loosely receiving the abutment so as to permit floating movements of the work-clamping member relative to the abutment, in combination with a locking connection comprising peripherally spaced pairs of bearing faces presented by said abutment and the wall of said bore respectively, the faces of each pair being opposed and slightly divergent; a filler member received between the faces of each pair and adapted to be shifted linearly when squeezed therebetween during floating movements of the work-clamping member; springs normally urging the fillers in the loosening direction, a disk fixed on the projecting end of the abutment, and an adjustable socket screw threaded in the disk in alinement with each filler.

8. A chuck having a drive ring with an abutment integral with and projecting from a face thereof and work-clamping members floatingly associated with the ring, one of said members being formed with a bore loosely receiving said abutment to permit floating movements of the work-clamping member relatively to the abutment; in combination with peripherally spaced pairs of opposed and slightly divergent wall faces presented by said abutment and bore, respectively, a filler member interposed between the faces of each pair and being sliftable linearly when squeezed therebetween during floating movements of said work-clamping member; a ball headed screw threaded in a bore provided in the end of the abutment post, a tiltable keeper mounted on said screw, and filler engaging members projecting from the keeper.

9. A lathe chuck disk having thereon a jaw floatingly mounted and formed with a bore hole, an abutment post immovably fixed to the disk and projecting loosely through the bore hole, fillers peripherally spaced and inserted between the post and the wall of the bore hole and slidingly adjustable lengthwise of the post responsive to eccentric movements of the floating jaw relatively to the post; devices associated with the post and engaging the fillers in their variously adjusted positions, and means for fixing said devices in their filler-engaging positions.

10. A work-holding chuck for lathes comprising a clamping jaw floatingly associated with a chuck ring and formed with a bore, said ring presenting a fixed abutment post projecting from a face thereof and loosely received in said bore; having in combination peripherally arranged pairs of opposed slightly divergent bearing faces on said post and bore, a filler received between the opposed faces of each pair and slidingly engaging the same, said fillers being adapted to move bodily lengthwise of said bearing faces when said jaw in its floating movements assumes various eccentric positions relatively to the axis of the post.

11. A chuck including a ring having a pair of work-seizing jaws floatingly mounted thereon, and a bore provided in a jaw, an abutment post fixed to the ring and projecting loosely into said bore to permit floating movements of the jaw with respect to the post; having, in combination, wall areas of the post and bore presenting pairs of opposed faces slightly divergent in the direction of the length of the post, a filler member slidingly received between each pair of faces and arranged and adapted to be shifted linearly therebetween by the squeezing and releasing actions of said faces occasioned by floating movements of said jaw, and releasable fastening means constraining said fillers against further linear shifting movements at any of the positions to which said fillers may have been shifted, whereby the fillers act to secure the jaws to the post without disturbing the relative positions of the planes of the jaws and ring.

12. In a chuck, a rotary chuck body, a work engaging member comprising two parts pivotally joined and floatingly mounted on said chuck body, a fixed abutment and an equalizing abutment disposed in spaced relation thereto on one part of said work engaging member adapted to engage the rough irregular surface of a prelocated work piece on the axis of the chuck, clamping means on the other part of said work engaging member for holding said work engaging abutments in engagement with the work piece, and means for locking said work engaging member to said chuck body when fully engaged on said work piece.

13. In a chuck, a rotary chuck body, a work engaging member floatingly mounted on said chuck body, a fixed abutment and an equalizing abutment in said work engaging member adapted to engage the rough irregular surface of a prelocated work piece on the axis of the chuck, clamping means on said work engaging member for holding said work engaging abutments in engagement with the work piece, and means for locking said work engaging member to said chuck body when fully engaged on said work piece.

FREDERICK S. FLOETER.